US005374949A

United States Patent [19]

Wada et al.

[11] Patent Number: 5,374,949

[45] Date of Patent: Dec. 20, 1994

[54] IMAGE FORMING APPARATUS

[75] Inventors: Takasumi Wada; Masayuki Tone; Hidemasa Aiba; Keiji Itsukushima, all of Tokyo, Japan; Ove Larson, Goeteborg, Sweden

[73] Assignees: Kyocera Corporation, Kyoto, Japan; Array Printers AB, Molndal, Sweden

[21] Appl. No.: 97,323

[22] Filed: Jul. 26, 1993

Related U.S. Application Data

[63] Continuation of Ser. No. 618,455, Nov. 27, 1990, abandoned.

[30] Foreign Application Priority Data

| | | | |
|---|---|---|---|
| Nov. 29, 1989 | [JP] | Japan | 1-309542 |
| Nov. 29, 1989 | [JP] | Japan | 1-309543 |
| Nov. 29, 1989 | [JP] | Japan | 1-309544 |
| Nov. 29, 1989 | [JP] | Japan | 1-309545 |
| Nov. 29, 1989 | [JP] | Japan | 1-309546 |
| Aug. 21, 1990 | [JP] | Japan | 2-218152 |

[51] Int. Cl.[5] .......... G01D 15/06

[52] U.S. Cl. .......... 346/154; 346/159; 355/245; 355/265

[58] Field of Search .......... 355/245, 251, 261, 264, 355/265, 269, 271, 276, 296, 308, 309, 215; 346/154, 153.1, 159; 358/301, 401

[56] References Cited

U.S. PATENT DOCUMENTS

| | | | |
|---|---|---|---|
| 3,853,397 | 12/1974 | Cantarano | 355/265 |
| 4,179,210 | 12/1979 | Bestenreiner et al. | 355/261 X |
| 4,478,510 | 10/1984 | Fujii et al. | 346/159 |
| 4,480,907 | 11/1984 | Vackier . | |
| 4,491,855 | 1/1985 | Fujii et al. | 346/159 X |
| 4,610,531 | 9/1986 | Hayashi et al. | 355/265 X |
| 4,868,600 | 9/1989 | Hays et al. | 355/265 X |
| 4,930,438 | 6/1990 | Demizu et al. | 118/651 |
| 5,036,341 | 7/1991 | Larsson | 346/154 |

FOREIGN PATENT DOCUMENTS

| | | |
|---|---|---|
| 9014959 | 6/1990 | WIPO . |
| 9104863 | 4/1991 | WIPO . |

*Primary Examiner*—A. T. Grimley
*Assistant Examiner*—Sandra L. Brasé
*Attorney, Agent, or Firm*—Spensley Horn Jubas & Lubitz

[57] ABSTRACT

An apparatus and method for printing directly on plain paper, utilizing an arrayed control grid having a plurality of toner slots. An alternating electrostatic field in a space between a toner carrier and a backing electrode gives toner a vibrational motion to prevent a toner clog at the slot. The field is also formed to repel the clogged toner back to the toner carrier, or to fall it down on a paper on the backing electrode during no print is performed to clean the control grid. A constitution of conductive and dielectric materials for the members assures to form the field.

19 Claims, 8 Drawing Sheets

IMAGE FORMING APPARATUS

This is a continuation of application Ser. No. 07/618,455 filed on Nov. 27 1990 now abandoned.

BACKGROUND OF THE INVENTION

1. Field of the Invention

The present invention relates to an image forming apparatus formed in a manner that toner image is attracted directly on a recording sheet or a plane paper without utilizing a photosensitive drum or other latent image carrier. Embodiments of the invention relate to an image forming apparatus having a toner carrier and a backing electrode on which surface the recording sheet is movable, wherein the backing electrode is disposed to face to the toner carrier, and having means for toner passage disposed therebetween, wherein the means for toner passage is consisted in a plurality of toner slots effectable to open and close electro-magnetically arrayed along desired direction.

2. Description of the Prior Art

A well known electro-photograph apparatus, which is used as printers and copying machines, operates by a process involving imprinting an electrostatic latent image on a photosensitive drum, developing the electrostatic latent image by applying a developing agent of single or two components, and transferring the visible developed image to a record surface such as a sheet of paper.

As far as the electrophotographic apparatus is based on the process of transferring the toner image on the recording sheet by means of the photosensitive drum, it involves, beside the photo-sensitive drum for carrying the electrostatic latent image, means for imprinting the latent image on the drum, means for transferring the toner image borne on the drum, means for cleaning the residual toner particles attached on the drum, means for erasing the latent image, and means for recharging such as a corona discharge device, resulting in the apparatus being complicated, especially when a number of such means must be disposed around the drum. Also, the resulting apparatus typically must be extraordinarily large in size in order to place such means around the drum so that the apparatus may perform its function.

An image forming apparatus to overcome drawbacks discussed above is disclosed in the U.S. Pat. Nos. 4,478,510 and 4,491,855 and U.K. Pat. Application GB 2 108 432A (referred as 'the first prior technique' hereinafter). The first prior technique employs means for toner passage, arrayed with one or two rows of toner slots effectable to open or close electromagnetically, arranged orthogonally (of which direction is referred as 'scanning direction' hereinafter) to the direction of the movement of a recording member movable on a backing electrode (of which direction is referred as 'subscanning direction' hereinafter), disposed between the backing electrode and a development roller which carries toner, in which a signal voltage corresponding to image information is applied to the means for toner passage to open selectively the toner slots during the movement of the recording member on the backing electrode, to transfer the toner borne on the surface of the toner carrier to the recording member through the toner slots.

The first prior technique, however, includes some restrictions for finer resolution (or printing dots density) which requires a more dense array of the slots, which issues other mechanical and manufacturing tasks.

A technique to resolve drawbacks as discussed above is disclosed in the PCT/SE88/00653 or International Publication No. WO89/05231 (referred as the basic technique hereinafter).

FIGS. 7(*a*) and 7(*b*) of the drawings show a principle of the basic technique which comprises a toner carrier 1 including a sleeve-like development roller la borne electromagnetically toner in a thin layer thereon, a control grid 3 arranged in a matrix and disposed between the toner carrier 1 and a backing electrode 2 to oppose thereof, wherein the control grid 3 is applied with a control voltage in direction X-Y axes to form a developing electric field corresponding to an image information, which subjects selectively toner slots 3*a* in the control grid 3 effectably to open and close thereof, causing the transfer of toner corresponding to the image information through the toner slot 3*a* in the control grid 3 on the recording paper 4 arranged on the surface of the backing electrode 2. Though the basic technique resembles to the first prior art in the view point above, the basic technique especially forms the control grid 3, as shown in FIG. 8(*a*), in a matrix of a plurality of X-axis loop wires X1-X2, . . . of which paired wires are formed in a loop arranged in a direction of the main scanning direction (X), and of a plurality of Y-axis paired loop wires Ya1-Ya2, . . . , wherein the two groups of the paired loop wires are arranged to intersect each other in an angle other than right angle, forming the portions surrounded by the paired loop wires Ya1-Ya2 on Y-axis and X1-X2 on X-axis as the toner slots 3*a*.

An electric voltage is applied to control grid 3, as shown in FIG. 8(*b*), successively on wires X1-X2, . . . with a time lag corresponding to the movement of the recording paper 4, resulting in a printing dot pattern passing through the toner slots 3*a* in a raw formable the dot pattern dense without arranging the interval between the wires Ya1-Ya2, . . . , nor the interval of toner slots 3*a* shorter in the main scanning direction.

There reveals, however, a lot of issues to realize a practical use in the first prior art technique and the basic technique as well.

The first issue involves clogging of the toner slot, and fade printing due to the sticking of residual toner.

As the basic technique is so constructed as to formed the dot pattern on the recording paper corresponding to the image information passing the toner through the toner slot, and as the control grid 3 is coated with an insulating layer thereon to prevent an electric leakage to the toner carrier 1 etc., toner sticks to the inside surface of the toner slot 3*a* electrostatically due to the friction between the toner and the toner slot 3*a* circumference or the surface of the control grid 3, liable to disturb a free flow of toner, and liable to disorder the image pattern formed on the recording paper 4.

What's worse, the clogging due to the sticking of toner on the toner slot 3*a* becomes more apparent, if the toner slot 3*a* was made to smaller to obtain the finer resolution of dot pattern.

In the event when a toner container is changed to a desired color, the toner adheres on the control grid spoils a proper coloring.

The toner passed through the toner slot 3*a* does not only clog therein, but also adheres circumferentially at a part of the toner slot 3*a* faced to the backing electrode 2. The toner at the port drops toward the backing electrode 2, and scatters around the print dots to fade a boundary line and to reduce the resolution.

The second issue is the prevention of electric leakage from the control grid 3 to other members.

The basic technique, as described above, has to dispose the toner carrier 1 close to the backing electrode 2 with a narrow space, a few hundreds micron meters for example, to form the electric field for development, and further, has to dispose the control grid 3 and the recording paper 4 therebetween, yielding some allowance for the thickness distribution of recording paper 4 in an interspace between the control grid 3 and the backing electrode 2, and yielding the thickness of the toner layer 90 in a space between the toner carrier 1 and the control grid 3, resulting the spaces extraordinarily tight, i.e., the space between the control grid 3 and the toner carrier 1, or the toner layer 90, and the interspace between the control grid 3 and the recording paper 4.

As the control voltage, as described above, is applied between the toner carrier 1 and the control grid 3 space with said tight space, there happens the discharge or leak between the toner carrier 1 and the control grid 3 to destroy the formation of the image, in the event when dielectric strength reduces due to the higher humidity; and also toner makes a bridge between them as an electric conductive member resulting in a failure to form the image, when the toner is made of electrically conductive materials.

As the developing voltage is applied between the toner carrier 1 and the backing electrode 2, and as the control voltage is applied on the control grid 3 in the tight space, the image fails to form due to the discharge or leak when the dielectric strength reduces due to the higher humidity, or in an occasion when a wet recording sheet is introduced in error therebetween.

A deviation of the interspace between the control grid 3 and the recording sheet 4 modifies the dot size on the recording sheet 4 through the toner slot 3a failing to form a fine image.

Although it is desirable to keep the interspace accurate, the recording sheet 4 floats and meanders. If one attempts to hold the recording sheet 4 in place by contacting the recording sheet 4 with means for positioning then it is likely that the image will be impaired, as the toner is not fixed yet on the recording sheet 4.

The third issue of the basic technique relates to the intensity of the print dot being under the influence of the control voltage applied on the control grid 3.

Further to the above, as will be described below, the open voltage $-V_1$ for effecting to open electromagnetically the toner slot 3a has always the same polarity of the charged particles, thus the passage of the toner slot 3a formed by the open voltage $-V_1$ becomes geometrically smaller; and that, the smaller the size of the toner slot 3a is made to obtain finer resolution, the narrower the physical area of the passage becomes, resulting in a thin dot, or forming image with poor intensity.

The fourth issue is a toner stain in a marginal area or a region where no print is developed.

In the development roller of the basic technique acting as the toner carrier 1, the toner layer on the development roller is formed uniformly with a doctor blade in more wider than the maximum width of the printing space to make the formation of the image easier.

Thus, as shown in FIG. 10, the control grid 3 formed with meshes and disposed in the space between the development roller 1 and the backing electrode 2 is extended beyond the maximum space for printing space to the marginal area or the region 40 where no print is provided. In the marginal area 40, as no toner transfers toward the backing electrode 2, the toner forms continuously a brush on the development roller 1 up to a grown-up toner layer 90, to pile a molehill on the control grid 3, to drop finally on the backing electrode 2, and to produce a stain thereon, even if the toner slot 3a has been electromagnetically effected to close.

SUMMARY OF THE DISCLOSURE

1. OBJECT

An object of an embodiment of the present invention is to provide an image forming apparatus which overcomes the drawbacks as discussed above, without clogging a toner slot, or with a feature to remove the clogging in the event a slot clogs, without any disturbance of the image, enabling fine resolution and clear image formation.

It is a further object of an embodiment of the present invention to provide an image forming method for easy alternation of color or coloring.

It is another object of an embodiment of the present invention to provide a clear and fine resolution image forming apparatus which prevents or minimizes toner sticking to the toner slot and a backing electrode, without fading the dot boundary.

It is still another object of an embodiment of the present object to provide an image forming apparatus preventing the occurrence of discharge or leak in a space between the control grid and the other members, thus enabling easy formation of a clear image.

It is a further object of an embodiment of the present invention to provide an image forming apparatus wherein floating or meandering of the recording sheet is minimized and further, enabling accurate positioning of the recording sheet without destruction of the image.

It is a related object of an embodiment of the present invention to provide an image forming apparatus compensating electrically the deviation of the space, and enabling the prevention or minimization of size variation of the dot.

It is a still another object of an embodiment of the present invention to provide an image forming apparatus with a sufficient dot intensity and clear image.

It is a further object of an embodiment of the present invention to provide an image forming apparatus enabling the elimination or minimization of a toner stain on the marginal area or the region where no image is provided, and to avoid the disturbance of the image on the recording paper at the boundary crossing from the area where no image is provided to the printing area.

Embodiment of the present invention will be described to achieve the objects above. The expression appearing in the claims as 'means for toner passage to form toner slots corresponding to the image information with controlling electric potential' may be generally interpreted as a control grid formed of FPC or wire electrodes or equivalents thereof, which is not to be necessarily restricted to the interpretation, but includes means performing the features said above, for example, of an arrangement of a plurality of electrodes arranged in parallel with a desired space crossing each other. The term 'the control grid' is used illustratively to express 'the means for toner passage' hereinafter.

The term 'a recording member' as stated in the claims is not necessarily restricted to a recording paper, but includes, for example, a plastic sheet. The term 'a recording paper' is used collectively to express illustratively the words above.

2. CONSTITUTION

Before describing embodiments of the present invention, the basic technique will be compared with the electrophotographic methods.

One of the electrophotographic methods relies on a normal developing method which employs of a photosensitive drum imprinted with a static electric latent image, and a development drum borne toner in a thin layer, wherein the drums are rotated synchronously opposing each other with a narrow space, and the toner charged with reverse polarity to the latent image is attached selectively on the portion where the latent image is formed on the photosensitive drum. Another reversal developing method relies on the feature wherein the toner charged with the same polarity to the latent image is attached selectively to the portion where no latent image formed on the photosensitive drum. Either method depends on a feature of forming the normal or reversal latent image corresponding to the image intended to be printed on page 11.

The developing method of the basic technique, on the other hand, though the formation of the electric developing image between a toner carrier 1 and a backing electrode 2 is similar to the conventional electrophotographic method, relies on the feature wherein the backing electrode 2 is charged with an uniform development voltage, toner slot 3a is effected to open and close selectively corresponding to the image information by means of the control grid 3 disposed in a space between the members 1 and 2 controlling the charges in the directions of X and Y axes, thus enabling the transfer of toner through the toner slot 3a on a recording paper 4 arranged on the backing electrode 2.

Suppose the toner is charged with a negative polarity, and the toner carrier 1 and the backing electrode 2 are provided with charges 0V (grounded) and $+V_0$ respectively, as shown in FIG. 9(*a*), a development field is formed to transfer the toner to the backing electrode 2. If the control voltage of $+\frac{1}{2}V_0$ is charged on the control grid 3 disposed half the interval between the members, the control grid 3 exerts no influence on the development field allowing the transfer of the toner on the whole surface of the backing electrode 2. Under the condition above, however, that the polarities of the control grid 3 and the toner oppose each others, the control electrode attracts all the all toner enabling no toner to be transferred toward the recording paper 4.

Then in a case as show in FIG. 9(*b*) when a weak control voltage $-V_1$ being the same polarity with the toner is applied, though the development field around the toner slot 3a is deformed due to the control voltage $-V_1$, the remaining central portion of the toner slot 3a allows the development field to reach to the backing electrode 2 to transfer the toner to the surface of the recording paper 4 placed thereon. The control voltage $-V_1$ is called an open voltage hereinafter.

Upon the control voltage, as shown in FIG. 9(*c*), is brought stronger up to a $-V_2$ with the same polarity as the toner, the reverse electric field around the toner slot 3a grows bigger proportionally to the intensity of the control voltage to close finally the central portion thereof, and the toner is repelled back to the toner carrier 1. The control voltage $-V_2$ is called a close voltage hereinafter.

On applying, therefore, the open voltage $-V_1$ or the close voltage $-V_2$ corresponding to the image information selectively on the X-Y loop wires which mesh the toner slot 3a, the toner passed through the toner slot 3a charged with the open voltage $-V_1$ is transferable in a desired print pattern to the recording paper 4 arranged on the surface of the backing electrode 2.

Considering the relationship $V_0>0V>-V_1>-V_2$, the open voltage $-V_1$ is a weak potential close to 0V, though it has the same polarity to that of toner. Thus the toner tends to rub on the toner slot 3a when it passes through, and to produce a charge due to triboelectricity especially in the occasion when the control grid 3 is coated with an insulating layer on which a part of toner attaches to clog the toner slot 3a.

According to an embodiment of the present invention, therefore, the development field formed in the space between the toner carrier 1 and the backing electrode 2 features as the development field formed with a pulsed voltage, or an alternating voltage of which polarity varies repeatedly from a positive state to a negative state, wherein the toner is attachable on the recording paper with a vibratory movement rather than in a constant direction within the space thereof, or with a vibratory movement on the surface of the toner surface, which allows to form a clear image, and to prevent the toner clogging. The alternating field may be formed in either way of applying the voltage on the backing electrode 2 or the toner carrier 1.

A further embodiment of the invention features to vibrate either one of the open voltage $-V_1$ or the close voltage $-V_2$, or both of them than to keep it or them constant, which is intended to give the electric vibration to toner, and to release it from clogging.

In the event when the open voltage $-V_1$ is vibrated, an area for toner passage of the toner slot is also affected to produce an unfavorable fluctuated dot pattern. Thus, it is preferable to vibrate the close voltage $-V_2$.

The control voltage is generally formed in a pulse wave that the vibratory wave may be adopted in a pulsed wave with a plurality of clock pulses as shown in FIG. 4(*c*).

The vibratory control voltage may sometime be hazardous especially in a period of image formation to destroy a clear image. A further embodiment of the invention features to form an electrostatic field between the control grid and the toner carrier during a period wherein no image is performed, to be able to repel the toner attached on the control grid back to the toner carrier.

The means for producing the electrostatic field, for example, may be a means to bring the backing electrode as to open and to have a voltage of the control grid as to be the same polarity as that of the toner.

Alternatively to repel the toner to the toner carrier, the toner attached on the control grid may be forced to attach on a recording paper arranged on the backing electrode. A further embodiment of the invention features to form an electrostatic field between the control grid and the backing electrode during the period when no print is performed, whereby the toner attached on the control grid is transferable on a recording paper arranged on the backing electrode.

The constitution may be attainable, for example, to break the toner carrier 1 off from the ground, to apply the developing voltage $V_0$ on the control grid 3, whereby the development field is formable between the control grid and the backing electrode.

As the inner and around surface of the toner slot 3a, as previously described, is coated with an insulator layer, the constitution above can not prevent toner from sticking on the surface due to the triboelectric charging. Thus as shown in FIG. 12, a further embodiment of the features to grid 3 a portion for preventing electrification 5C (50A or 50B) at the inner side of the toner slot 3*a* and/or at the surface facing to the backing electrode or the toner carrier to eliminate the triboelectric charging, to improve a fade dot due to the toner adherence at the inner side of the toner slot 3*a* and the outer surface faced to the backing electrode 2 or the toner carrier, to be able to form a clear and high resolution dot pattern.

The portion for preventing electrification 50 may be formed with a layer of surface detergent applied on the inner surface of the toner slot 3*a* and/or outer surface opposed to the backing electrode 2 and to the toner carrier 1, or may be formed with a layer made of conductive or semiconductive material 50B, or may be formed with a coating insulator layer 50A containing surface detergent applied around the toner slot 3*a*.

A further embodiment of the invention is aimed to prevent the clogging and adherence of the toner at the toner slot 3*a* by means of the toner carrier 1, which features to form the toner carrier 1 made of conductive materials with an insulator layer on the surface at least facing to the means for toner passage.

In the constitution above, the toner carrier 1 with the insulator layer thereon, as will be described below, can have its potential brought into infinitive by breaking off the ground line therefor, which allows an electrostatic field to form between the control grid 3 and the backing electrode 2 if the control grid 3 is grounded (0V), resulting in dropping off the toner stuck on the toner slot 3*a* of the control grid 3 on a paper moving on the backing electrode 2 in the period when no print is performed, thus enabling easily the cleaning of the control grid 3.

The constitution of the toner carrier 1 made of conductive materials, and to subject the toner carrier 1 being grounded and the backing electrode 2 being at $+V_0$, allows the electrostatic field to form as described above, and also eliminates or minimizing the possibility of a short circuit or leak from control grid 3 to the toner carrier 1 as the surface thereof is insulated.

This assures a stable development without a short circuit or leak in a space between the toner carrier 1 and the control grid 3.

The constitution above requires to coat the control grid 3 as well with an insulation layer, if the toner carrier 1 is made of conductive materials; while the insulation of the toner carrier 1 alone performs the object above, if the toner is made of insulating materials. The term, therefore, 'to coat the control grid 3 with an insulating layer' is not necessarily an indispensable matter for the constitution.

A further embodiment of the invention is aimed to assure the steady toner transfer when the toner slot 3*a* in the control grid 3 is formed in a smaller size to obtain a dense dot pattern, and aimed to provide an image forming apparatus with a finer resolution and a clean image. This feature employs a magnetic toner made in single component, forming a sharply pointed projection of toner or a toner ear 9 on the toner carrier 1, arranging the toner ear 9 long enough to attach on the surface of the control grid 3. The toner ear 9 makes a forcible entry into the toner slot 3*a* of which the electrostatic field is formed to be able to transfer the toner with an application of the open voltage $-V_1$, whereby the dot pattern is able to form with a sufficient image intensity.

If the development field is formed in an alternating field varying its polarity from a positive state to a negative state repeatedly, the toner is attachable on the recording paper with a vibratory movement rather than in a constant direction within the field thereof, allowing to form a clear image, and to prevent the toner slot 3*a* from clogging as well.

A further embodiment of the invention features a control grid 3 of which surface facing to the toner carrier 1, or facing to the recording paper 4 is formed with an insulating layer.

The constitution above is able to prevent a short circuit or leak from the control grid 3 to other members even if tight spaces are formed the control grid 3 and the toner layer 1*a*, and between the control grid 3 and the recording paper 4, enabling to form easily a clear image.

The application of a conductive toner requires an insulating layer coated inside surface of the toner slot 3*a*, while an insulating toner requires no such coating.

The deviation of the spaces shares a considerable part comparing to the space interval as the space itself is so tight, even if the members have been well machined and precisely assembled, resulting in the variation of the dot size on the recording paper 4. Hence, a further embodiment of the invention provides an image forming apparatus wherein the electric control of the means for toner passage employs a pulsed voltage, and wherein a duty ratio or other electric input conditions of the pulsed voltage is controlled to the variation of the interval between the means for toner passage and other members.

In the event the spaces fluctuate, the fluctuation is compensated electrically to prevent the dot size on the recording paper from being varied, and especially with the pulsed voltage which achieves easily and precisely.

A further embodiment of the invention improves the toner stain characteristics in a marginal region or a region 40 where no print is performed, wherein means 41, 3B is provided for charging a voltage corresponding to the polarity of the toner layer 90 borne on the toner carrier 1, or in other words, a voltage corresponding to the reverse polarity of that of the backing electrode 2, to be disposed within the same plane as the control grid 3 and within a portion corresponding to the marginal region, wherein the charge is applicable at least during the period in which printing is performed, whereby the toner layer 90 corresponding to the marginal region or the region 40 where no print is performed is repelled back toward the toner carrier 1 to prevent the toner stain thereon.

The means for charging 41 may be formed separately of the control grid 3 which fixes the marginal region 40. To avoid this, the means for charging is formed preferably as a part of the control grid 3 wherein the means for charging 3A, 3B in the control grid 3 are variable corresponding to the width W of the recording paper 4 wherein the voltage with reverse polarity preferably is set high to close electromagnetically the toner slot 3*a*.

Therefore, the region 40 where no print is performed may include a fixed region beyond the paper size W together with the marginal region within the paper size W.

BRIEF DESCRIPTION OF THE DRAWINGS

FIGS. 1 to 3 relate to an image forming apparatus according to the first embodiment of the present invention in which FIG. 1 is a schematic section view showing whole members of an apparatus; FIG. 2 is a cross sectional view showing an image forming device of a main part of an apparatus; and FIG. 3 is an enlarged view showing developing members of an apparatus.

FIG. 4(*b*) is a diagram showing effectable signals; and FIG. 4(*c*) is a wave form chart showing a close voltage.

FIGS. 5 and 6 relate to an image forming apparatus according to another embodiment of the present invention in which FIG. 6 is an elevation view showing a main part of developing members; FIG. 5(*a*) and (*b*) relate to a grid unit in which FIG. 5(*a*) is a perspective illustration showing a control grid and a dummy electrode; FIG. 5(*b*) is a perspective illustration showing an electrode unified with the control grid and the dummy electrode.

FIGS. 8(*a*) and 8(*b*) relate to a control grid in which FIG. 8(*a*) is an illustration showing a wiring array of X-Y axes loop wires and FIG. 8(*b*) is a wave form chart showing control signals; FIGS. 9(*a*), 9(*b*) and 9(*c*) are illustrations showing a control grid effected to open/close.

DETAILED DESCRIPTION OF THE PREFERRED EMBODIMENTS

Preferred embodiments of the present invention will be described in detail with reference to the accompanying drawings. However, the sizes, materials, shapes, relative arrangement of parts stated in the embodiments are not intended to limit the scope of the present invention but are merely illustrative examples, unless otherwise specified.

Figure 1:
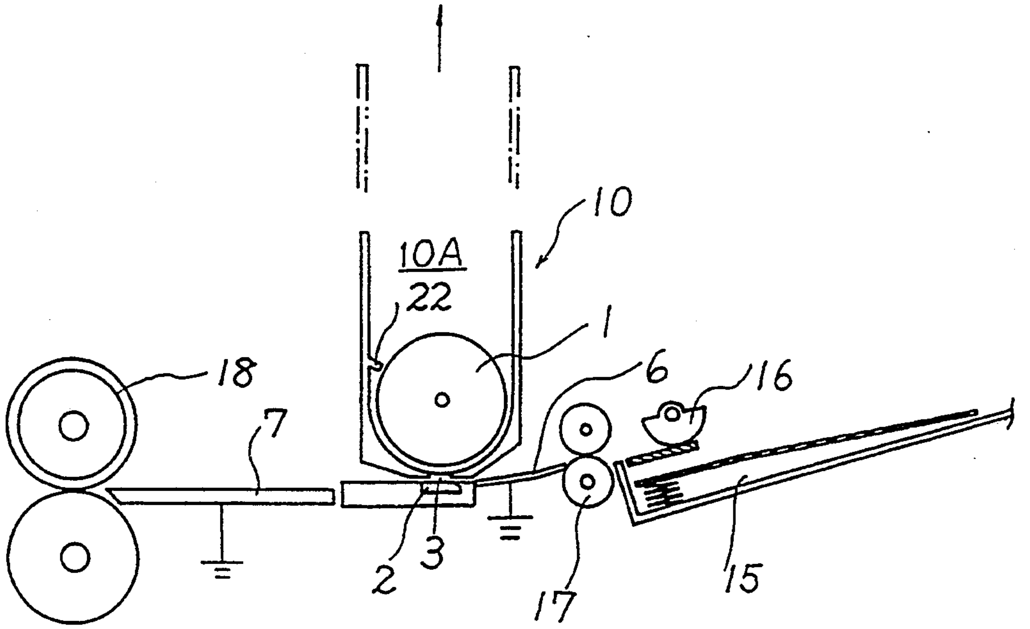

FIG. 1 is a schematic section view showing whole members of an image forming apparatus according to an embodiment of the present invention. The apparatus comprises means for paper/feeding consisting of a paper cassette 15 and a feed roller 16 disposed along a recording paper convey line, register rollers 17, an inlet guide 6, an image forming unit 10 illustrated in FIG. 2 in detail, a convey guide 7, and a pair of fixing rollers 18, wherein a recording paper 4 in the paper cassette 15 is fed by the feed roller 16, and pauses before entering into the image forming unit 10 through the inlet guide 6 with a timing of electrical control for a control grid 3.

The recording paper 4 borne an unfixed toner image which is formed by the image forming unit 10 corresponding to the image information of which detail will be described later enters into the fixing roller pair 18 through the covey guide 7 to fix the toner image.

The inlet guide 6 is made of conductive material which is grounded through means for ground 6a to remove the charge formed triboelectrically with the register roller 17 etc., and of which tail end is bent convex slightly so that the front end of the recording paper 4 will slide steadily on the surface of a backing electrode 2 in the image forming unit 10.

The convey guide 7 is made of flat conductive materials, and is also grounded through means for ground 7*a* as well as the inlet guide 6 is grounded, to remove the charge of paper received in the image forming device before entering into the fixing rollers 18.

The image forming unit 10 consists of a unit body 10A being removable from, and lodgeable into the apparatus, and a backing electrode 2 disposed on an apparatus 10B and opposed to the unit body 10A. The unit body 10A comprises a toner container 8 with a long and narrow opening 21 at the bottom, a development roller or toner carrier 1 disposed in the toner container 8 opposing to the opening 21, and the control grid 3 stretched near the bottom of the toner container 8, wherein the members are formed in a single unit mechanically assembled or rotatably supported, whereby the unit 10A is vertically removable apart the backing electrode 2.

Figure 2:
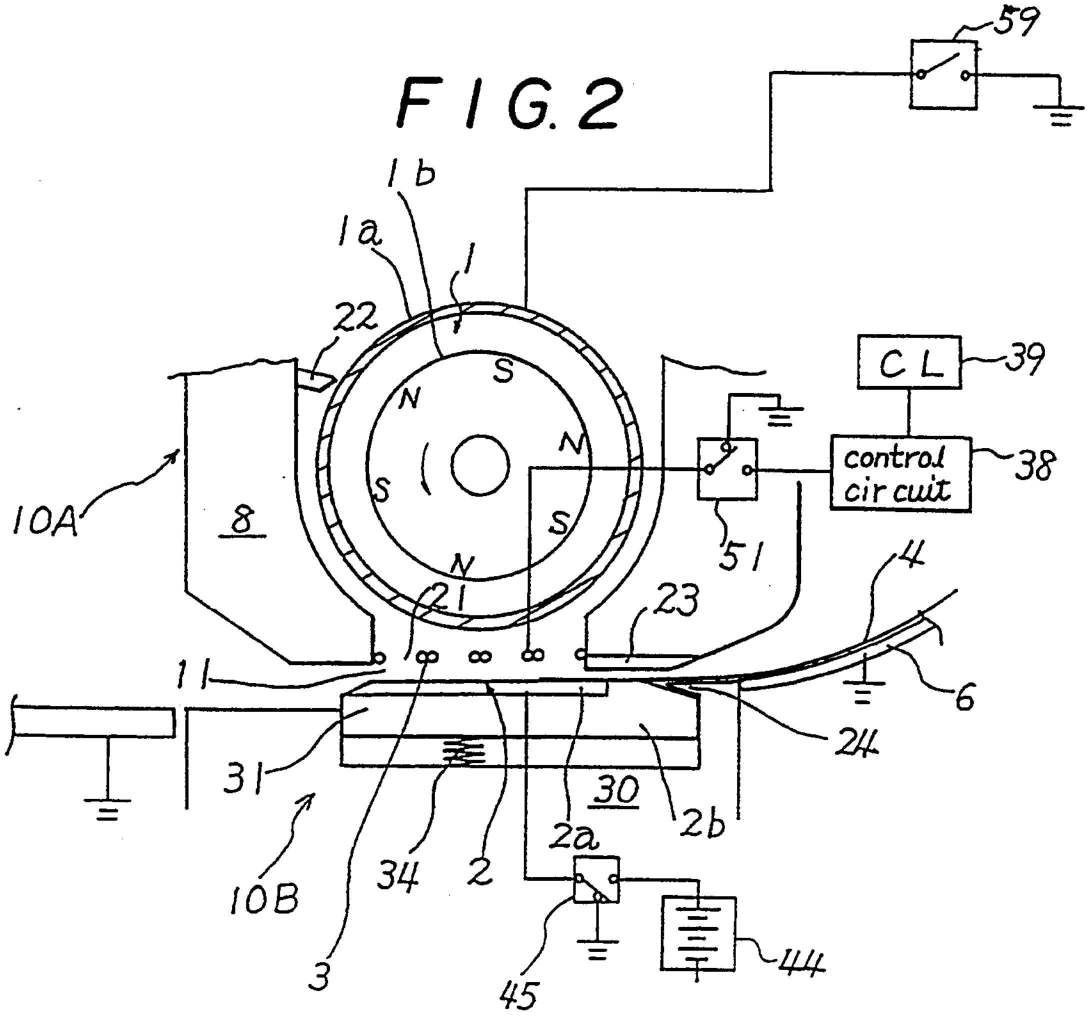

Referring to FIG. 2 of the drawings, there is illustrated a detailed sectional view of the image forming unit 10. The toner container 8 containing single component high resistance magnetic toner has a doctor blade 22 therein facing to the development roller 1. A spacer 23 formed in a thin knife edge like is disposed at the bottom of the toner container 8 next to the opening 21 at the paper inlet side over a full width of the recording paper 4, whereby the recording paper 4 is guided during its pass.

The development roller 1 comprises a development sleeve 1*a* which includes a fixed magnet assembly 1*b*. The sleeve 1*a* is made of aluminum (nonmagnetic) coated with an insulation layer, or has an Alumite surface treatment applied thereon, and is grounded through a switch 59.

Figure 4:
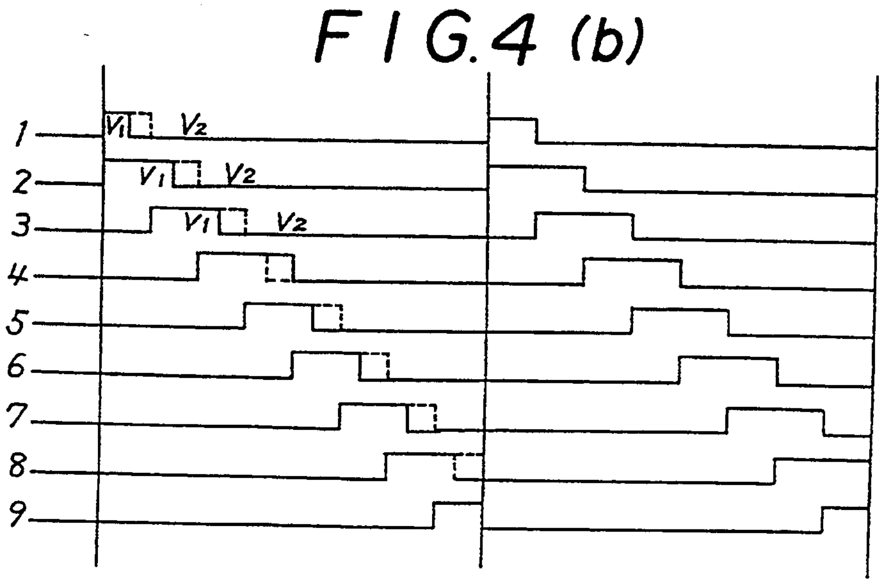
FIGS. 4(*a*), (*b*) and (*c*) relate to a control grid according to another embodiment of the present invention in which FIG. 4(*a*) is a schematic elevation view showing a main part of a control electrode.
Figure 4:
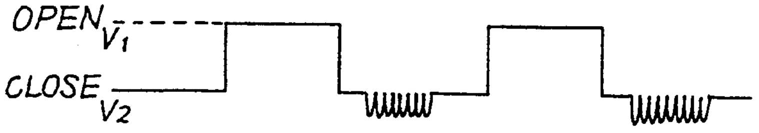
Figure 4:
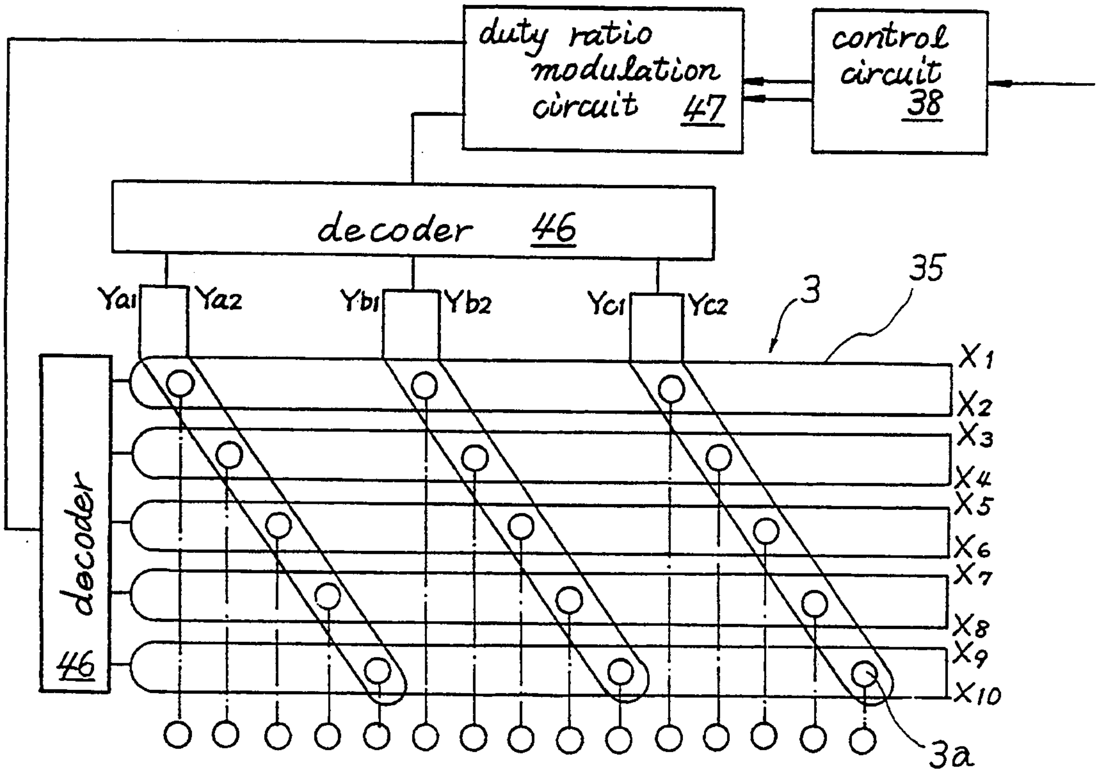

The control grid 3, as shown in FIGS. 4(*a*) and 8(*a*), comprises a plurality of paired loop wires X1-X2, . . . of which paired wires are formed in a loop stretches in the main scanning direction (X), and a plurality of Y-axis paired loop wires Ya1-Ya2, . . . , wherein the two groups of the paired loop wires X1-X2, . . . and Ya1-Ya2, . . . are arranged to intersect each other in a matrix array with an angle other than right angle, wherein the matrix wires are inserted between insulating layers to form FPC—standing for flexible print circuit, wherein a portion surrounded by the paired loop wires Ya1-Ya2 on Y-axis and X1-X2 on X-axis forms a toner slot 3*a*.

Figure 11:
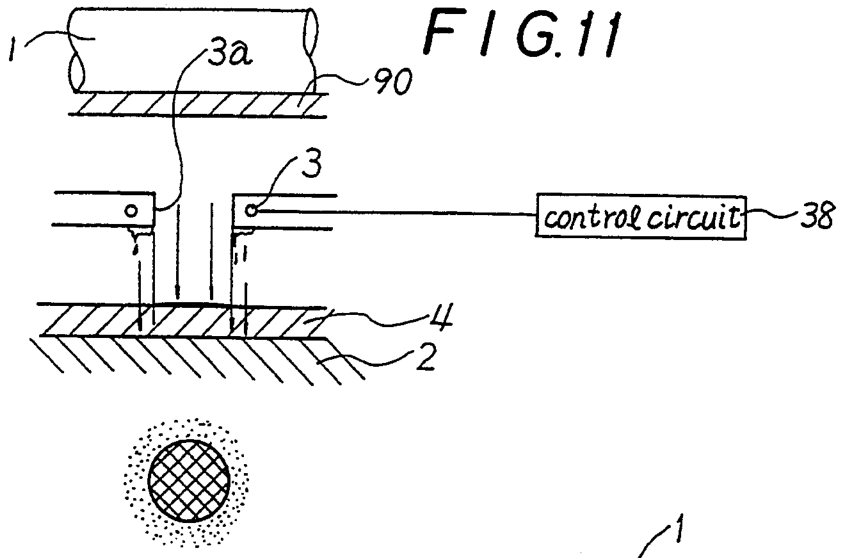
FIG. 11 is an illustration showing an issue of a control grid coated with an insulation layer for an embodiment of the present invention.

The toner slot 3*a* made in FPC with the insulation layer inside the inner diameter and around the port, as shown FIG. 11, toner sticks on the inner diameter and around the port of the toner slot 3*a* due to the triboelectric charging, the toner stuck on the inner diameter of the toner slot 3*a* and around the port facing to the backing electrode 2 scatters around the dot to produce a fade dot.

Figure 12:
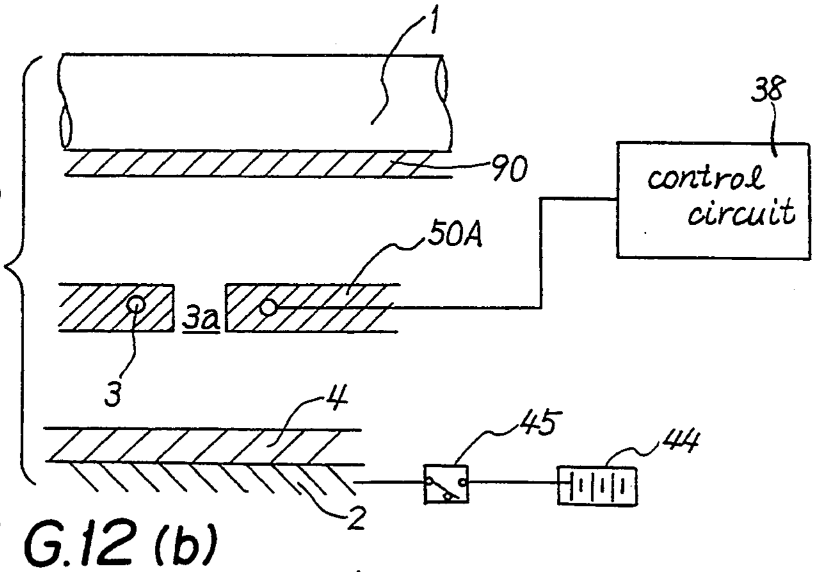
FIGS. 12(*a*) and 12(*b*) are illustrations showing means for solving the issues above.
Figure 12:
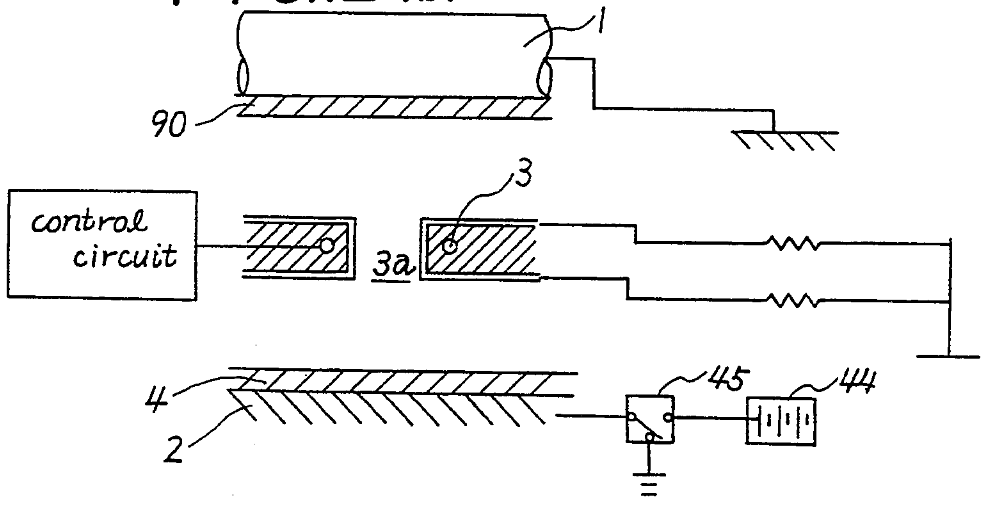

Then, as shown on FIG. 12(*a*), surface detergent is applied inside the diameter and around its port of toner slot 32, or an insulation layer 50A mixed with surface detergent around the loop wires to prevent the toner slot 3*a* from being stuck triboelectrically inside the diameter thereof and around the port facing to the backing electrode 2 or the development roller 1, resulting in the avoidance of the fade dot and the ability to form a clear and fine resolution dot pattern.

As shown on FIG. 12(*b*), the layer may be formed witch a layer 50B made of conductive or semiconductive materials and being grounded.

The control grid 3 is connected with an electric control circuit 38 which is able to generate a high frequency pulse with a clock circuit 39 through a switch 51 (refer to FIG. 2). The electric control circuit 38 provides the open/close voltages $-V_1$, $-V_2$ corresponding to the image information by a host signal, and provides the open/close voltages $-V_1$, $-V_2$ charging on the loop wires synchronized with the convey speed of the recording paper 4 with a determined time lag effectable to array successively the dots in a line on the recording paper 4, as shown on FIGS. 4(*b*), and 8.

The backing electrode 2 is formed of its body 2*a* with a conductive member in a flat belt to oppose to the control grid 3 with a parallel space. The conductive member is connected with a developing voltage generator 44 through a switch 45 and is chargeable a square waved voltage of which polarity swings in a positive to a negative states or a sinusoidal alternating voltage, referred collectively as an alternating voltage hereinafter.

The development operation of an embodiment will be described referring FIG. 2 as follow.

Upon turning the switch 59 for ground, the development field is formed in the space between the backing electrode 2 and the developing sleeve 1*a*, then the sleeve 1*a* rotates counterclockwise indicated by an arrow. Toner particles triboelectrically by friction against each other in the container 8 is held on the sleeve 1*a* with the magnetic force of the fixed magnet assembly 1*b*, and is conveyed to the developing region after the thickness thereof is controlled with the doctor blade 22.

Figure 3:
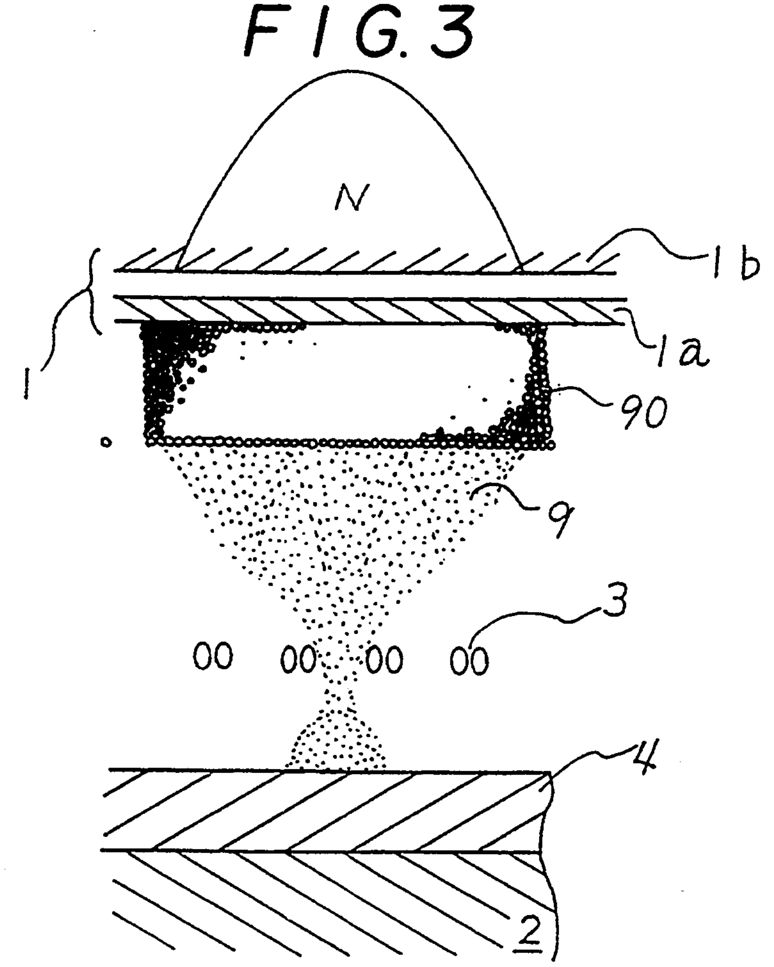

During the conveying downstream, as shown in FIG. 3, a toner ear 9 is formed with the fixed magnet assembly 1*b* on the sleeve 1*a* attachable with the surface of control grid 3.

Upon receiving the pulse control voltages $-V_1$, $-V_2$ generated with the electric control circuit 38 corresponding to the image information as shown in FIG. 4(*b*), the toner ear 9 makes a forcible entry into the opening of the toner slot 3*a* charged with the open voltage $-V_1$, forming a dot pattern corresponding to the image information on the recording paper 4 fed on the backing electrode 2 with the timing by means of the register roller 17.

Since the control voltage applied on the backing electrode 2 is the alternating voltage which swings from the positive state to the negative state, toner moves back and forth toward the sleeve 1*a* in the developing space to attach on the recording paper 4, enabling to form a clean image and to prevent the toner slot 3*a* from sticking thereon.

Furthermore, a short circuit or leak can not occur in the space between the control grid 3 and the sleeve 1*a*, as being insulated by means of surface treatment such as Alumite treatment etc., thereon.

After a preferred number of sheets has been printed, upon cutting off the ground by turning off the switch 59 connected with the sleeve 1*a*, and upon grounding the control grid 3 by turning the switch 51, the developing voltage is applied to backing electrode 2 to remove the toner sticking on and around the toner slot 3*a* of the control grid 3 on a paper passing on the backing electrode 2, enabling the cleaning of the control grid 3.

To effect the cleaning, the backing electrode 2 may be put into open by turning the switch 45 while the control grid 3 is put into the same polarity to that of the toner.

FIG. 4(*a*) shows another embodiment of the present invention, of which the control circuit comprises a decoder 46 connected with the control grid 3, an electric control circuit 38 for selectively controlling the X-axis loop wires and the Y-axis loop wires of the control grid 3 through a duty ratio modulation circuit 47, wherein the duty ratio and the pulse width of the pulse signals generated with the electric control circuit 38 are formed to be adjustable.

Thus, the modulator 47 adjust the electrostatic field across the toner slot 3*a* regulating the duty ratio and width of the pulse signals according to the variations of interspace intervals between the control grid 3 and the backing electrode 2, and/or between the control grid 3 and the surface of the recording paper 4 in the event when the paper thickness varies, preventing the dot size from fluctuating on the recording paper 4.

Figure 5:
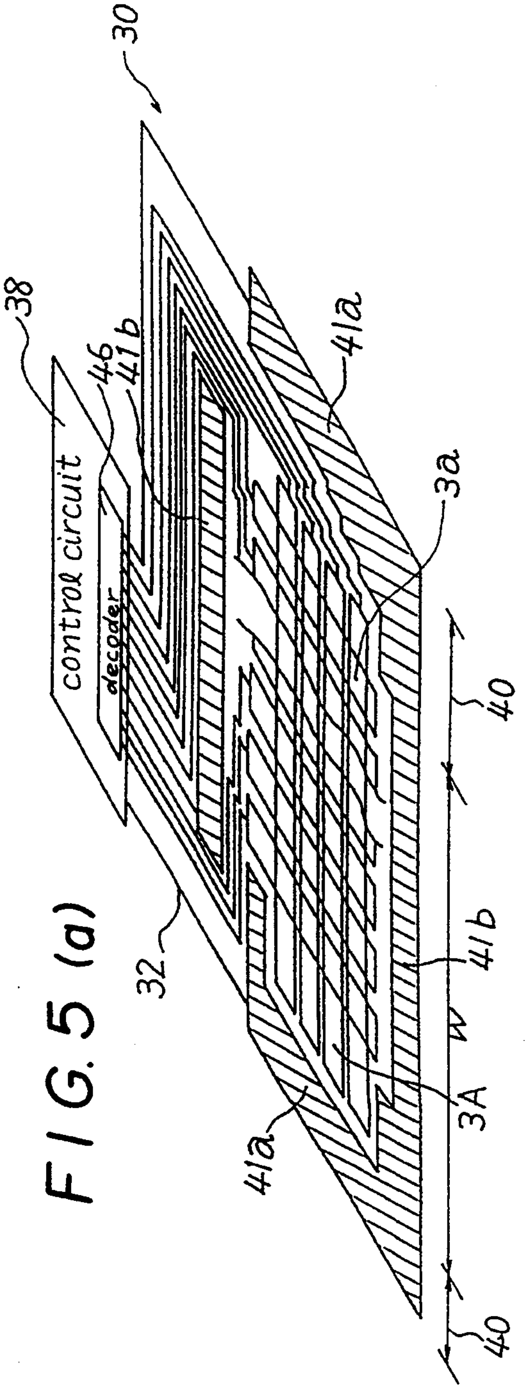
Figure 5:
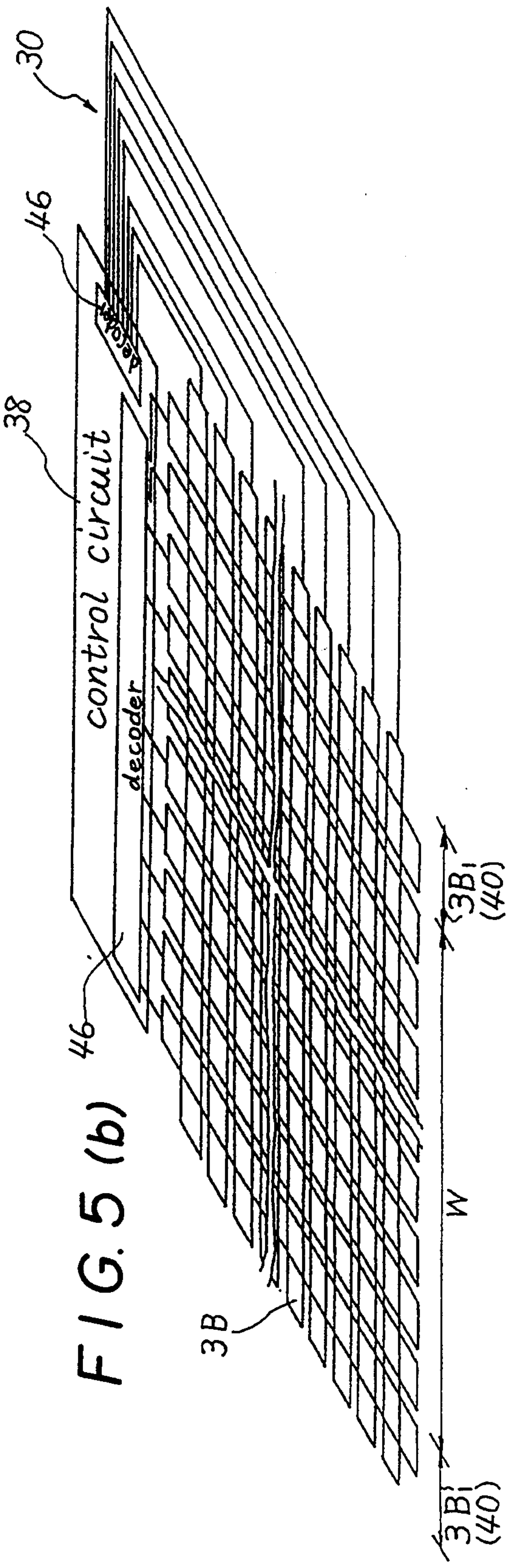
Figure 6:
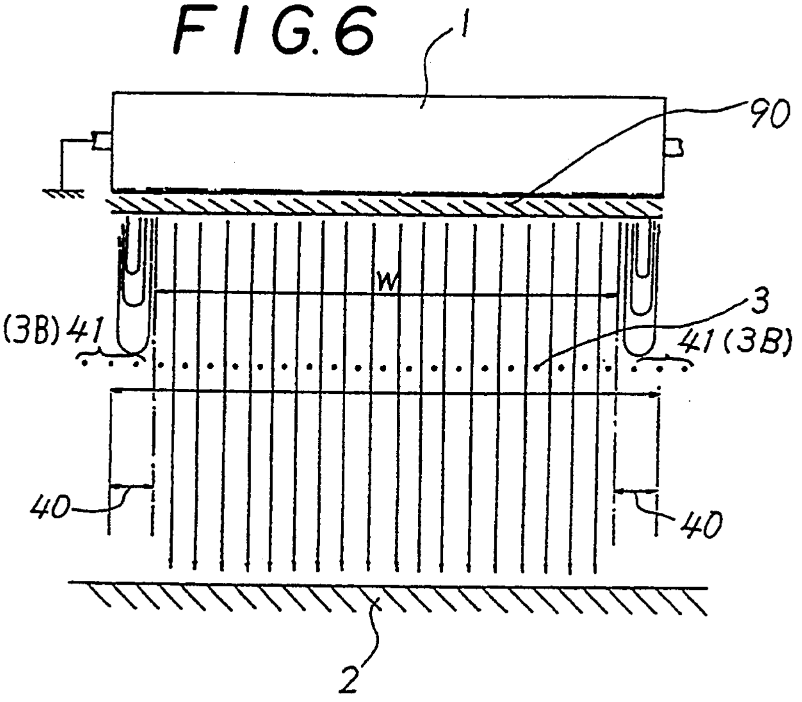
Figure 7:
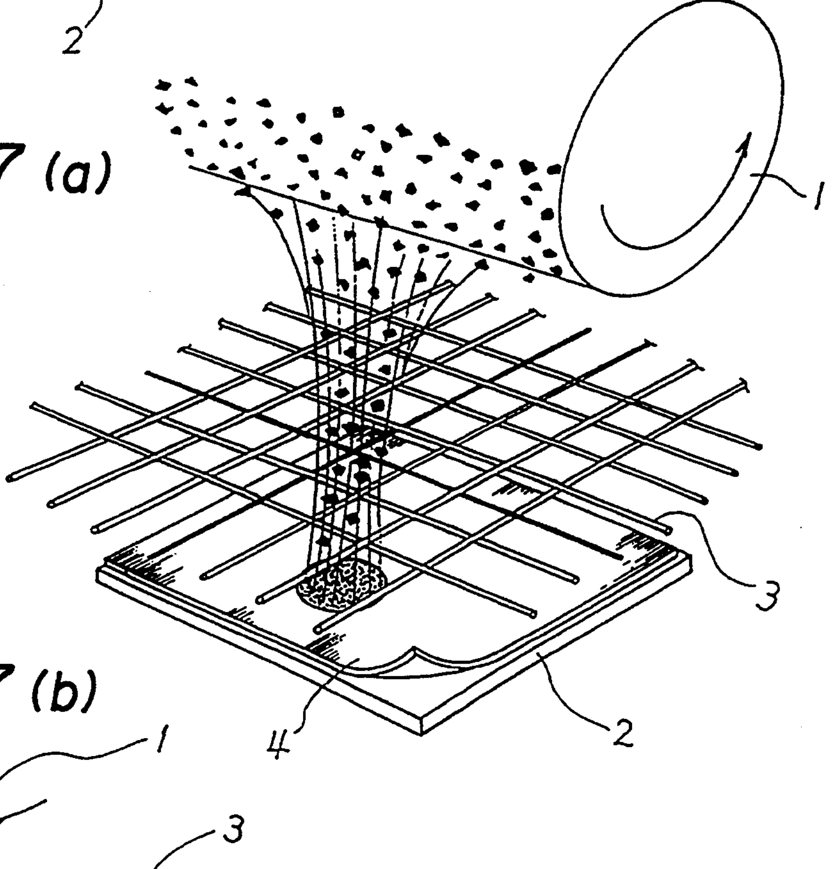
FIGS. 7 to 9 relate to the basic technique applicable to embodiments of the present invention in which FIGS. 7(*a*) and 7(*b*) are illustrations showing operational members.
Figure 7:
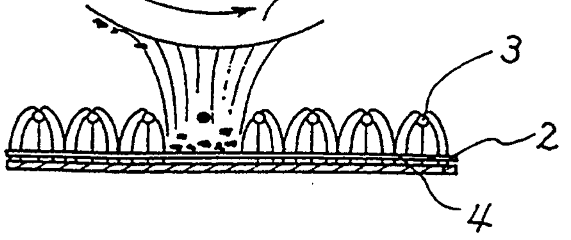
Figure 8:
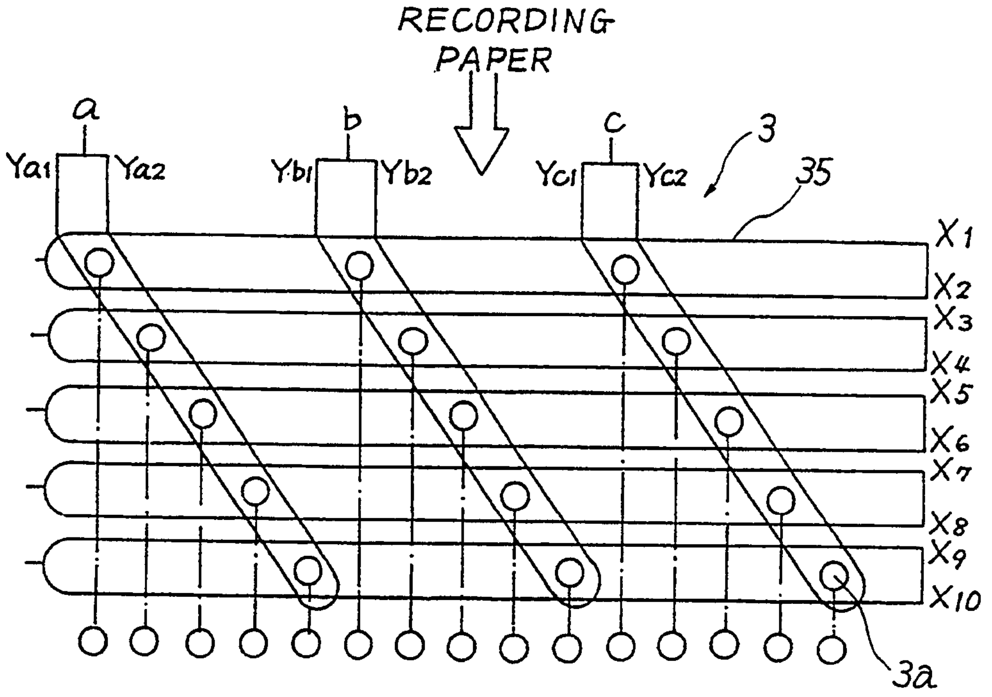
Figure 8:
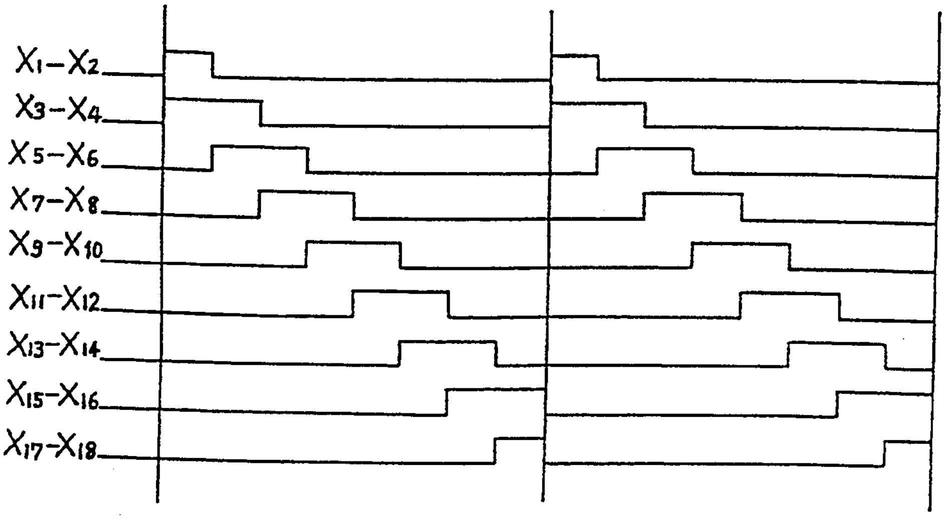
Figure 9A:
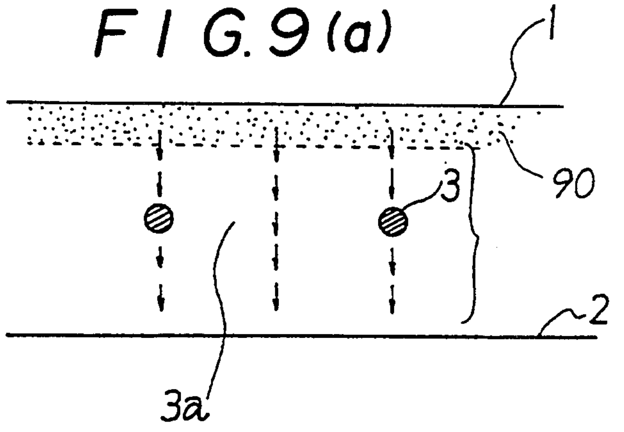
Figure 9B:
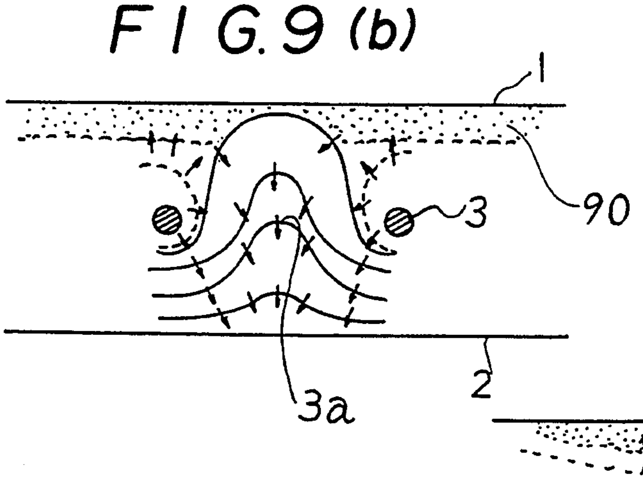
Figure 9C:
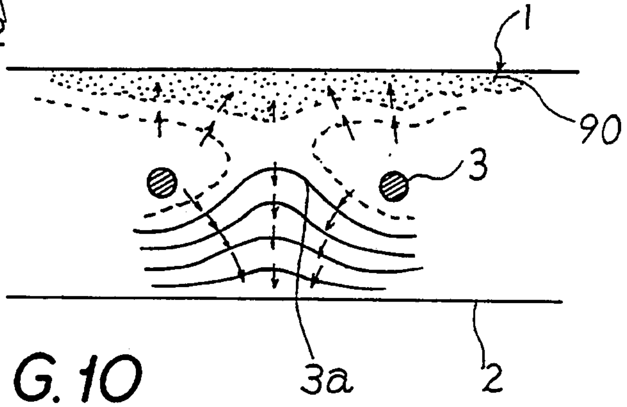
Figure 10:
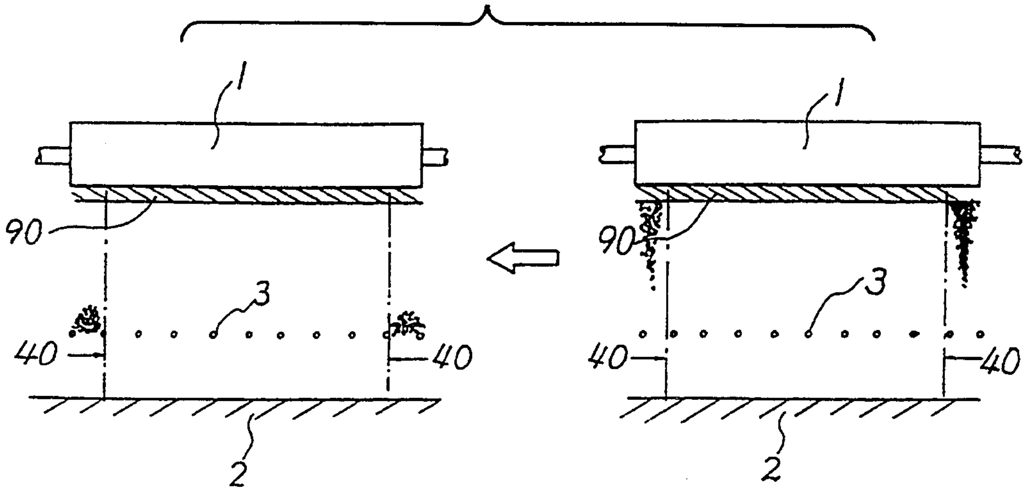
FIG. 10 is a schematic illustration showing operational issues for embodiment of the present invention.

FIG. 5(*a*) shows still another embodiment of the present invention relating a control unit, of which control unit 30 comprises a flat dummy electrode 41 (41*a*, 41*b*) disposed around the control grid 3A arrayed with toner slots 3*a* in a matrix, wherein the dummy electrode 41 is connected with the electric control circuit 38 through a lead wire 32.

The control grid 3A comprises a plurality of paired X-axis loop wires extending along the main scanning axis within the maximum paper width W, and with a plurality of paired Y-axis loop wires disposed in a plain parallel to that of X-axis loop wires with a tight space wherein the two groups of the loop wires form a toner slot 3*a* in a matrix.

The dummy electrode 41, on the other hand, is arranged around the control grid 3A. Each dummy electrode 41*a* disposed on the main scanning axis has a width corresponding to the width of the development roller 1 outside the maximum paper width W. In the subscanning direction, the overall length of the control grid 3A and the dummy electrode 41*b* covers the shorter length of the opening 21.

Assuming the polarity of the toner is negative, the potential of the development roller 1 is grounded 0V, the backing electrode 2 is set as +2,000V, and the voltages for the control grid body 3A are set at −800V and −300V for close/open the toner slot 3*a* respectively in the constitution above, an −800V close voltage is applied to the dummy electrode 41 during a period of on printing and off printing as well to repel the toner piled on the development roller 1 which prevents a stain in a region where no printing is performed, and to prevent a disturbance at the border crossing from the region 40 where no printing is performed.

In the embodiment above, since the dummy electrode 41 is formed in the flat plate with no toner slot, the intensity of the potential is not limited as above, but is enough if it can repel the toner piled on the development roller 1, or is satisfactory in the most cases even if it has a reverse polarity to that of the backing electrode 2. On the other hand, due to the constitution wherein the dummy electrode 41 and the control grid 3A are formed separately, the dummy electrode 41 is not adaptable to all paper sizes varying the region 40 where no print is performed.

FIG. 5(*b*) shows another embodiment of the present invention to solve the issue above, wherein control grid 3B is formed in a longitudinal size in the direction of development roller 1 equivalent to the length of region for forming a toner layer, and in a transversal size enough to cover the opening 21, wherein the control circuit 38 applies a voltage corresponding to the close voltage −800V during the period on printing and off printing as well on the area 3B1 of the control grid 3B corresponding to the area outside the maximum width W, or may include the marginal area.

What is claimed is:

1. In an apparatus for forming an image, having a toner carrier with a toner layer thereon, a backing electrode adjacent which a recording sheet is arrangeable, said backing electrode spaced from and facing the toner carrier, and means for selectively passing toner disposed between the toner carrier and the backing electrode, said means defining a plurality of toner slots, said toner slots operable to selectively open and close electromagnetically, said apparatus operable to selectively open the toner slots in response to a control potential corresponding to image information applied to the means for passing toner and to transfer toner from the toner carrier to the recording sheet through the toner slots, wherein the improvement comprises:

an electric signal source connected across the toner carrier and the backing electrode to apply an electric signal between the toner carrier and the backing electrode for forming an electrostatic field in the space from the toner carrier to the backing electrode to transfer the toner to the recording sheet, said electrostatic field periodically alternating in polarity between positive and negative states.

2. In an apparatus for forming an image, having a toner carrier with a toner layer thereon, a backing electrode adjacent which a recording sheet is arrangeable, said backing electrode spaced from and facing the toner carrier, and means for selectively passing toner disposed between the toner carrier and the backing electrode, said means defining a plurality of toner slots, said toner slots operable to selectively open and close electromagnetically in response to open and close control potentials, respectively, said apparatus operable to selectively open the toner slots in response to an open control potential corresponding to image information applied to the means for passing toner and to transfer toner from the toner carrier to the recording sheet through the toner slots, wherein the improvement comprises:

means for fluctuating the amplitude of said close control potential, wherein the toner stuck on the toner passage electromagnetically vibrates.

3. Apparatus as claimed in claim 2, wherein the control potential is a series of voltage pulses composed of a plurality of clock pulses.

4. In an apparatus for forming an image, having a toner carrier with a toner layer thereon, a backing electrode adjacent which a recording sheet is arrangeable, said backing electrode spaced from and facing the toner carrier, and means for selectively passing toner disposed between the toner carrier and the backing electrode, said means defining a plurality of toner slots, said toner slots operable to selectively open and close electromagnetically, said apparatus operable to selectively open the toner slots in response to a control potential corresponding to image information applied to the means for passing toner and to transfer toner from the toner carrier to the recording sheet through the toner slots, wherein the improvement comprises:

forming an electrostatic field merely in an interspace between the means for passing toner when no image is being formed, wherein toner stuck on the means for toner passage is transferred to the recording sheet adjacent the backing electrode.

5. Apparatus as claimed in claim 4, wherein the means for forming the electrostatic field merely in the interspace between the means for passing toner and the backing electrode when no image comprises an insulating layer provided on the toner carrier and means for polarizing the toner carrier with the same polarity as that of the toner.

6. In an apparatus for forming an image, having a toner carrier with a toner layer thereon, a backing electrode adjacent which a recording sheet is arrangeable, said backing electrode spaced from and facing the toner carrier, and means for selectively passing toner disposed between the toner carrier and the backing electrode, said means defining a plurality of toner slot, said toner slots operable to selectively open and close electromagnetically, said apparatus operable to selectively open the toner slots in response to a control potential corresponding to image information applied to the means for passing toner and to transfer toner from the toner carrier to the recording sheet through the toner slots, wherein the improvement comprises:

a layer for preventing electrification formed inside the toner slots;

wherein the layer for preventing electrification is formed of insulating material mixed with a surface active agent.

7. In an apparatus for forming an image, having a toner carrier with a toner layer thereon, a backing electrode adjacent which a recording sheet is arrangeable, said backing electrode spaced from and facing the toner carrier, and means for selectively passing toner disposed between the toner carrier and the backing electrode, said means defining a plurality of toner slots, said toner slots operable to selectively open and close electromagnetically, said apparatus operable to selectively open the toner slots in response to a control potential corresponding to image information applied to the means for passing toner and to transfer toner from the toner carrier to the recording sheet through the toner slots, wherein the improvement wherein:

the toner carrier is made with an electric conductive material, and an insulating material is provided on the surface of toner carrier facing the means for passing toner.

8. In an apparatus for forming an image, having a toner carrier with a toner layer thereon, a backing electrode adjacent which a recording sheet is arrangeable, said backing electrode spaced from and facing the toner carrier, and means for selectively passing toner disposed between the toner carrier and the backing electrode, said means defining a plurality of toner slots, said toner slots operable to selectively open and close electromagnetically, said apparatus operable to selectively open the toner slots in response to a control potential corresponding to image information applied to the means for passing toner and to transfer toner from the toner carrier to the recording sheet through the toner slots, wherein the improvement comprises:

the toner including a magnetic material, a plurality of magnets being circumferentially disposed inside the toner carrier to bring the toner into ears thereon, said toner ear extending to the surface of the means for passing toner.

9. In an apparatus for forming an image, having a toner carrier with a toner layer thereon, a backing electrode adjacent which a recording sheet is arrangeable, said backing electrode spaced from and facing the toner carrier, and means for selectively passing toner disposed between the toner carrier and the backing electrode, said means defining a plurality of toner slots, said toner slots operable to selectively open and close electromagnetically, said apparatus operable to selectively open the toner slots in response to a control potential corresponding to image information applied to the means for passing toner and to transfer toner from the toner carrier to the recording sheet through the toner slots, wherein the improvement comprises:

providing a pulsed voltage signal for the control potential applied to the means for passing toner, and controlling the duty ratio and pulse length of said pulsed voltage signal according to the variation of the distance between the means for toner passage and other members.

10. In an apparatus for forming an image, having a toner carrier with a toner layer thereon, a backing electrode adjacent which a recording sheet is arrangeable, said backing electrode spaced from and facing the toner carrier, and means for selectively passing toner disposed between the toner carrier and the backing electrode, said means defining a plurality of toner slots, said toner slots operable to selectively open and close electromagnetically, said apparatus operable to selectively open the toner slots in response to a control potential corresponding to image information applied to the means for passing toner and to transfer toner from the toner carrier to the recording sheet through the toner slots, wherein the improvement comprises:

means for applying a charge having a polarity opposite to that of the charge of the backing electrode, said means for applying the charge located in the same plane of the means for passing toner, within the area where no print is developed, wherein the charge of reverse polarity is applied to the means for applying charge during the occasion when no print is developed.

11. Apparatus as claimed in claim 10, wherein the potential level of the reverse polarity is effectable to close the toner slot.

12. In an apparatus for forming an image, having a toner carrier with a toner layer thereon, a backing electrode adjacent which a recording sheet is arrangeable, said backing electrode spaced from and facing the toner carrier, and means for selectively passing toner disposed between the toner carrier and the backing electrode, said means defining a plurality of toner slots, said toner slots operable to selectively open and close electromagnetically, said apparatus operable to selectively open the toner slots in response to a control potential corresponding to image information applied to the means for passing toner and to transfer toner from the toner carrier to the recording sheet through the toner slots, wherein the improvement comprises:

means for applying a charge having a polarity which is the same as that of the charge of toner on the toner carrier, said means for applying the charge located in the same plane of the means for passing toner within the area where no print is developed, wherein the charge of the same polarity is applied to the means for applying charge during the occasion when no print is developed.

13. In an image forming apparatus having a toner carrier with a toner layer thereon, a backing electrode spaced from and facing the toner carrier, and a control grid disposed between the toner carrier and the backing electrode for selectively passing toner from the toner layer toward the backing electrode, wherein the improvement comprises:

an electric signal source connected across the toner carrier and the backing electrode to apply an alternating electric signal between the toner carrier and the backing electrode for forming an electrostatic field in the space from the toner carrier to the backing electrode, said electrostatic field periodically alternating in polarity between positive and negative states.

14. In an image forming apparatus having a toner carrier with a toner layer thereon, a backing electrode spaced from and facing the toner carrier, an electric field for drawing toner from the toner layer toward the backing electrode, a control grid having a toner passage disposed between the toner carrier and the backing electrode for selectively passing toner from the toner layer toward the backing electrode and means for applying a close control signal to the control grid for controlling the grid to inhibit passing toner through the toner passage from the toner layer toward the backing electrode, wherein at least some of the toner inherently collects on the control grid around the toner passage, the improvement comprises:

means for fluctuating the amplitude of said close control potential, wherein the toner collected on the control grid electromagnetically vibrates.

15. Apparatus as claimed in claim 14, wherein the control signal comprises a series of voltage pulses.

16. An image forming apparatus comprising:

a toner carrier with a toner layer thereon, the toner carrier being made of an electrically conductive material;

a backing electrode spaced from and facing the toner carrier;

a control grid disposed between the toner carrier and the backing electrode for selectively passing toner from the toner layer toward the backing electrode; and an insulating material provided on the surface of toner carrier facing the means for passing toner.

17. An image forming apparatus comprising:

a toner carrier having a layer of magnetic toner thereon;

a backing electrode spaced from and facing the toner carrier;

a control grid having toner passages disposed between the toner carrier and the backing electrode for selectively passing toner through the toner passages from the toner layer toward the backing electrode; and a magnet in the toner carrier arranged to form the toner into at least one ear extending to at least one toner passage of the control grid.

18. In a method for forming an image with an image forming apparatus having a toner carrier with a toner layer thereon, a backing electrode spaced from and facing the toner carrier, a control grid having a toner passage disposed between the toner carrier and the backing electrode for selectively passing toner through the toner passage from the toner layer toward the backing electrode and means for applying a control signal to the control grid for selectively controlling the passage of toner through the toner passage, the improvement comprising the steps of:

providing a pulsed voltage signal as the control signal applied to the control grid, and adjusting at least on of the duty ratio and pulse length of said pulsed voltage signal dependant on variations of the distance between the control grid and at least one of the toner carrier and the backing electrode.

19. In an image forming apparatus having a first mode of operation for forming a predefined image a second mode of operation wherein no predefined image is formed, the apparatus having a toner carrier with a toner layer thereon, a backing electrode spaced from and facing the toner carrier, and a control grid disposed in a plane and having toner passages disposed between the toner carrier and the backing electrode for selectively passing toner through the toner passages from the toner layer toward the backing electrode, the apparatus defining a first area along the backing electrode wherein an image is formed by toner passing through the control grid and a second area along the backing electrode wherein no controlled image is formed, wherein the improvement comprises:

chargeable means for carrying a charge having a polarity opposite to that of the charge of the backing electrode, said chargeable means located in the same plane as the control grid, adjacent the second area along the backing electrode; and means for applying the chargeable means with said charge of opposite polarity during the second mode of operation.

* * * * *